United States Patent [19]

Haas et al.

[11] Patent Number: 5,242,078
[45] Date of Patent: Sep. 7, 1993

[54] BIODEGRADABLE RIBBED DISH

[75] Inventors: Johann Haas, Klosterneuburg; Franz Haas, Leobendorf; Franz Haas, Sr., Vienna, all of Austria

[73] Assignee: Franz Haas Waffelmaschinen Industriegesellschaft m.b.H., Loebendorf, Austria

[21] Appl. No.: 954,005

[22] Filed: Sep. 30, 1992

[30] Foreign Application Priority Data

Oct. 1, 1991 [AT] Austria .................... 1972/91

[51] Int. Cl.⁵ .................... B65D 81/34; A23F 5/04
[52] U.S. Cl. .................... 220/574; 219/10.55 E; 219/10.55 F; 99/DIG. 14; 229/903
[58] Field of Search .................... 219/10.55 E, 10.55 F; 206/515, 518, 557; 99/DIG. 14; 229/903; 220/DIG. 13, 574; 426/107, 243

[56] References Cited

U.S. PATENT DOCUMENTS

| | | | |
|---|---|---|---|
| 3,461,260 | 8/1969 | Bremer | 219/10.55 F |
| 3,920,144 | 11/1975 | Callen | 220/571 |
| 4,538,732 | 9/1985 | Kuchenbecker | 229/903 |
| 4,704,510 | 11/1987 | Matsui | 219/10.55 E |
| 4,831,224 | 5/1989 | Keefer | 219/10.55 E |
| 4,859,822 | 8/1989 | Ragusangel | 219/10.55 E |
| 4,925,682 | 5/1990 | Miya | 229/903 |

FOREIGN PATENT DOCUMENTS 862424 3/1961 United Kingdom .................... 220/571

*Primary Examiner*—Joseph Man-Fu Moy
*Attorney, Agent, or Firm*—Herbert Dubno; Andrew Wilford

[57] ABSTRACT

A receptacle made of a starch-based biodegradable material is formed with a side wall, and a generally flat floor formed with an array of criss-cross upstanding ridges projecting from and unitary with a surface of the floor and meeting at intersections. Each rib has an undulating, generally sinusoidal, outer edge having high points spaced relatively far from the surface and low points relatively close to the surface. The ribs are positioned such that each intersection is at a high point of one of the ribs and a low point of another of the ribs.

6 Claims, 1 Drawing Sheet

BIODEGRADABLE RIBBED DISH

FIELD OF THE INVENTION

The present invention relates to a biodegradable food container. More particularly this invention concerns a ribbed dish intended for holding a foodstuff.

BACKGROUND OF THE INVENTION

It is known to vend food in containers or receptacles that nowadays are specifically designed to be biodegradable so that when discarded they rot readily. To this end the containers are made of mainly starchy materials. A typical recipe for such a container is, by mass:
90% carbohydrates,
01% protein,
06% water, and
03% additives, such as lipids, minerals, and fillers.
This mixture is pressed into the desired shaped and baked to form the desired container.

In order to make such a container fairly rigid, it typically has a floor formed with upstanding ribs, in particular when made of the above-described relatively weak substance which have little of the strength of the politically incorrect foamed-plastic containers. When such a ribbed container is made of the above-described mixture, material masses at the intersections of the ribs so that it does not cook thoroughly there, making a weak spot or, worse, leaving the material so raw it can get into the food that eventually is served in the container.

OBJECTS OF THE INVENTION

It is therefore an object of the present invention to provide an improved starch-based container with a ribbed floor.

Another object is the provision of such an improved starch-based container with a ribbed floor which overcomes the above-given disadvantages, that is which can be thoroughly cooked while remaining relatively strong

SUMMARY OF THE INVENTION

A receptacle made of a starch-based biodegradable material is formed with a side wall, and a generally flat floor formed with an array of criss-cross upstanding ridges projecting from and unitary with a surface of the floor and meeting at intersections. Each rib has an undulating, generally sinusoidal, outer edge having high points spaced relatively far from the surface and low points relatively close to the surface. The ribs are positioned such that each intersection is at a high point of one of the ribs and a low point of another of the ribs.

Thus with this system there is no significant massing of the material at the intersections so that the device can cook through and be of maximum rigidity. On the other hand there is no significant loss of strength from the fact that the ribs are of undulating shape and in fact the undulations provide an excellent point contact for the food being held, something particularly advantageous for greasy items which should not sit in their own oil.

According to the invention the high points of each rib are laterally aligned with the low points of the immediately adjacent parallel rib. It is also possible for the low points to be generally flush with the floor surface.

The floor of this invention has an annular outer edge and the side wall is annular and attached to the floor at its outer edge. The side wall projects from the floor surface in the same direction as the ribs or can even project from the floor in a direction opposite the direction in which the ribs project from the floor surface. The latter system is advantageous in that it gives the bottom of the receptacle a good grip on what it is sitting on due to the point contact rather than surface contact.

BRIEF DESCRIPTION OF THE DRAWING

The above and other objects, features, and advantages will become more readily apparent from the following, reference being made to the accompanying drawing in which.

SPECIFIC DESCRIPTION

Figure 1:
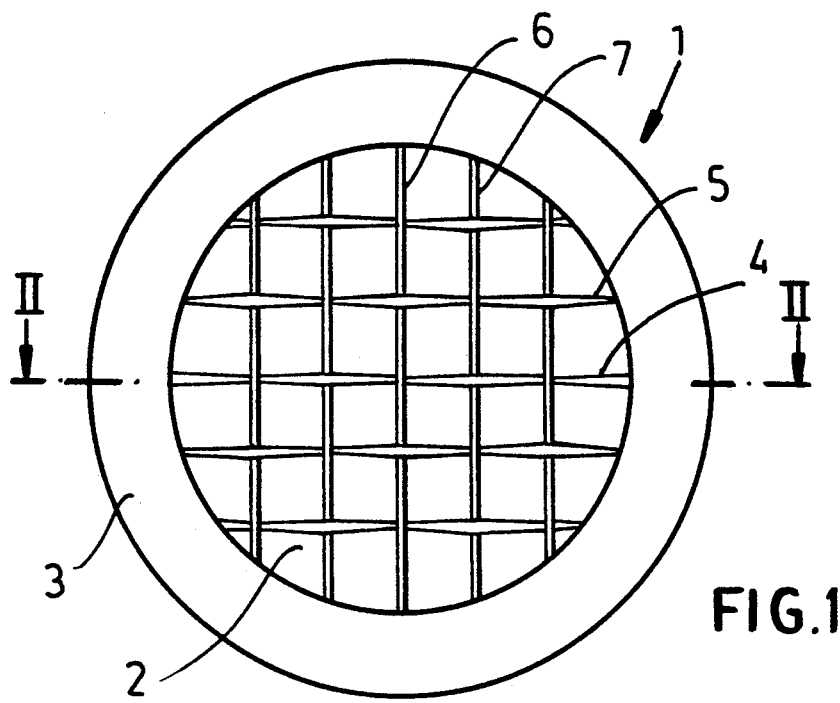
FIG. 1 is a top view of the receptacle according to the invention.
Figure 2:
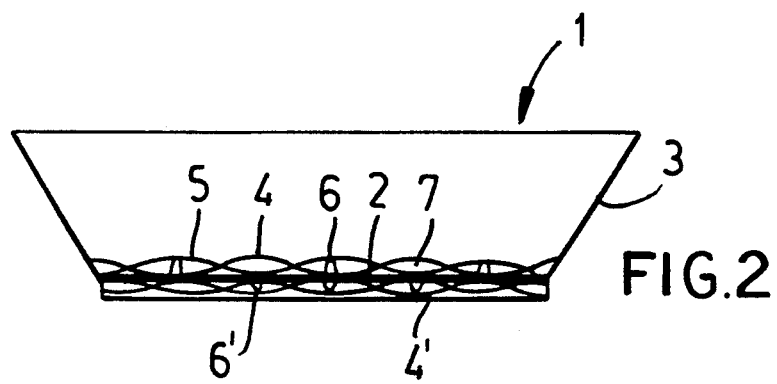
FIG. 2 is a section taken along line II—II of FIG. 1.

As seen in FIGS. 1 and 2 a dish 1 according to the invention has a substantially planar and circular floor 2 and a frustoconical side wall 3 rising from the outer periphery of the floor 2. The floor 2 is formed with a criss-cross array of ribs 4, 5, 6, and 7 meeting at intersections at right angles. In the drawing fewer ribs than are normally used are shown so as not to clutter the illustration; in reality the ribs are substantially more closely spaced and numerous.

Figure 3:
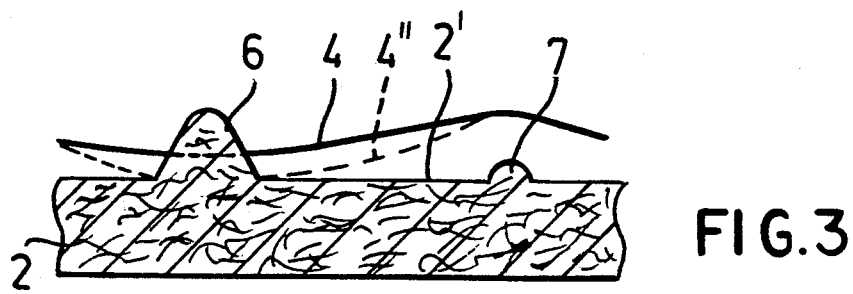
FIG. 3 is a large-scale view of a detail of FIG. 2.

According to the invention as seen in FIG. 3 each rib has high points and low points, with the outer edge of each rib running generally sinusoidally or as a zig-zag. The high points and low points and the point-to-point wave length is such that at each intersection the high point of one rib meets the low point of the crossing rib. Thus two parallel and immediately adjacent ribs run 180° out of phase with each other. Once again for illustration purposes the wave length of the ribs is exaggerated; in reality it would be much shorter since the intersection-to-intersection spacing is a half wave length.

FIG. 1 also shows at 4' and 6' how the lower surface of the floor 2 can be formed with such an array of ribs. When the dish 1 is to be used with a highly liquid contents, e.g. soup, this is advisable so the consumer's spoon will not bump over the ribs. When ribs are provided on both faces of the floor 2 the ribs are set in alignment with each other, but their outer edges are parallel so that a low point of a bottom-surface rib lies directly underneath a high point of a top-surface rib.

FIG. 3 shows at 4" how the wave height of the ribs can be such that at their low points they run into the surface 2' of the floor 2, that is they disappear altogether and become flush with the floor surface 2'.

In any case the system of this invention has several advantages over the prior art. The food in the container is held up on the ribs so that it is less likely to get soggy. In addition the intersections are fairly simple and do not present four deep corners in which things can readily collect. At the same time the container can be discarded without harm to the environment.

We claim:

1. A receptacle made of a starch-based biodegradable material, the receptacle being formed with
    a side wall; and
    a generally flat floor formed with an array of criss-cross upstanding ridges projecting from and unitary with a surface of the floor and meeting at intersections, each rib having a undulating outer edge having high points spaced relatively far from the surface and low points relatively close to the surface, the ribs being positioned such that each intersection is at a high point of one of the ribs and a low point of another of the ribs.

2. The receptacle defined in claim 1 wherein the high points of each rib are laterally aligned with the low points of the immediately adjacent parallel rib.

3. The receptacle defined in claim 1 wherein the low points are generally flush with the floor surface.

4. The receptacle defined in claim 1 wherein the floor has an annular outer edge and the side wall is annular and attached to the floor at its outer edge.

5. The receptacle defined in claim 1 wherein the side wall projects from the floor surface in the same direction as the ribs.

6. The receptacle defined in claim 1 wherein the side wall projects from the floor in a direction opposite the direction in which the ribs project from the floor surface.

* * * * *